(12) United States Patent
Larkin

(10) Patent No.: US 7,901,241 B1
(45) Date of Patent: Mar. 8, 2011

(54) DUAL LEVEL MODULAR NETWORK CABLE HUB

(76) Inventor: Kevin B. Larkin, Pebble Beach, CA (US)

( * ) Notice: Subject to any disclaimer, the term of this patent is extended or adjusted under 35 U.S.C. 154(b) by 580 days.

(21) Appl. No.: 11/954,905

(22) Filed: Dec. 12, 2007

(51) Int. Cl.
*H01R 13/72* (2006.01)
(52) U.S. Cl. ............ 439/501; 174/53; 242/389; 242/397
(58) Field of Classification Search .................. 439/501; 174/53; 242/389, 397
See application file for complete search history.

(56) References Cited

U.S. PATENT DOCUMENTS

| 5,773,757 | A  | * | 6/1998  | Kenney et al. ............... | 174/53  |
| 6,077,108 | A  | * | 6/2000  | Lorscheider et al. ......... | 439/501 |
| 6,780,047 | B1 | * | 8/2004  | Laity et al. .................... | 439/501 |
| 7,220,144 | B1 | * | 5/2007  | Elliot et al. .................... | 439/535 |
| 2006/0046561 | A1 | * | 3/2006 | Lam et al. ...................... | 439/501 |
| 2006/0286861 | A1 | * | 12/2006 | Avevor et al. ................. | 439/501 |

* cited by examiner

*Primary Examiner* — Gary F. Paumen
(74) *Attorney, Agent, or Firm* — Johannes Schneeberger

(57) ABSTRACT

Network cables are provided via spool cartridges removeably held inside snap-in cassettes that again are slideably inserted and snap arrested in a rack mountable chassis. The network cables are spring loaded spooled such that they autonomously retract upon unplugging and such that they are straightened while plugged in. Each snap-in cassette has a rear connector that is snap connected to the spooled network cable via an externally releasable connector pair inside the snap-in cassette. The network cables are spooled around a continuously rotating contact hub configured for high frequency signal transfer. The rear connectors reach through the chassis for a centralized network connection. The chassis is dimensioned in conjunction with well known computer rack standards for simple integration into server station architectures. The dual level modularity of spool cartridges inside the snap-in cassette inside the chassis provides for maximum system flexibility and maximum network connections.

30 Claims, 10 Drawing Sheets

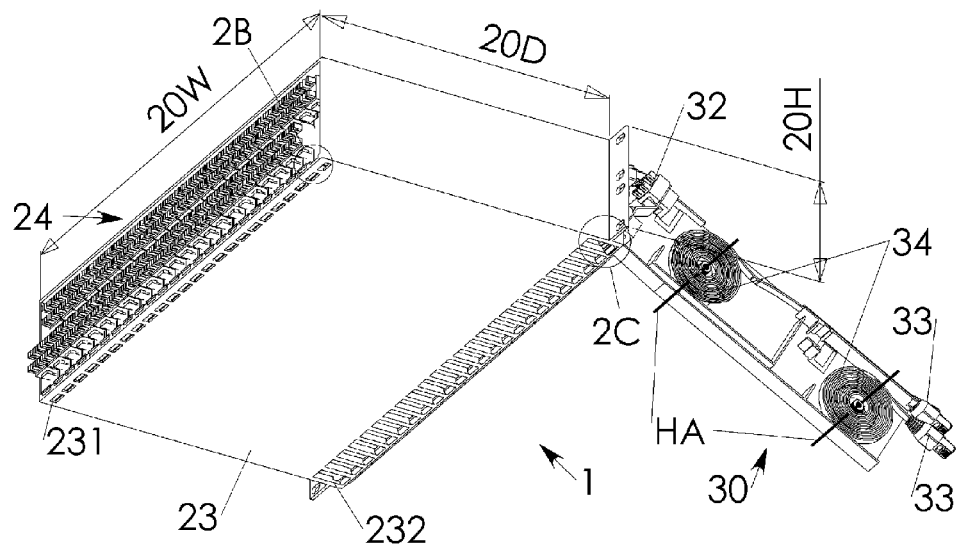
Fig. 2A
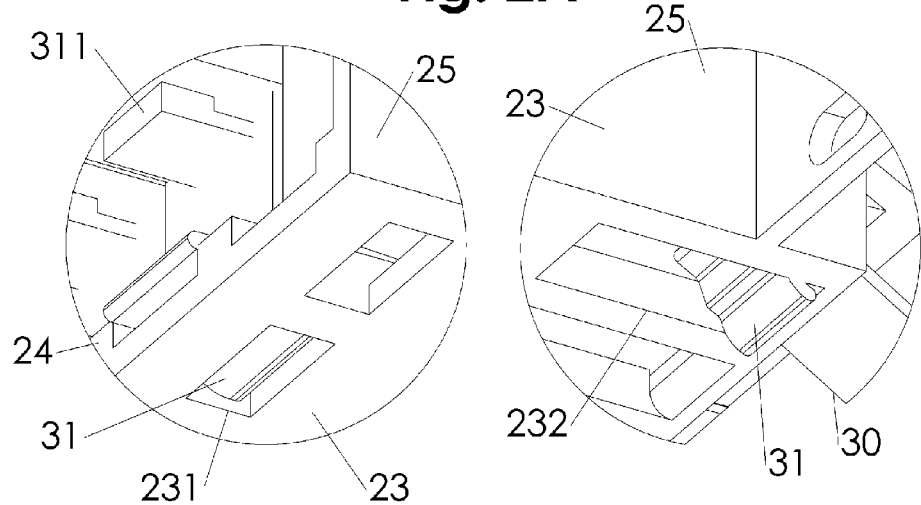
Fig. 2B     Fig. 2C

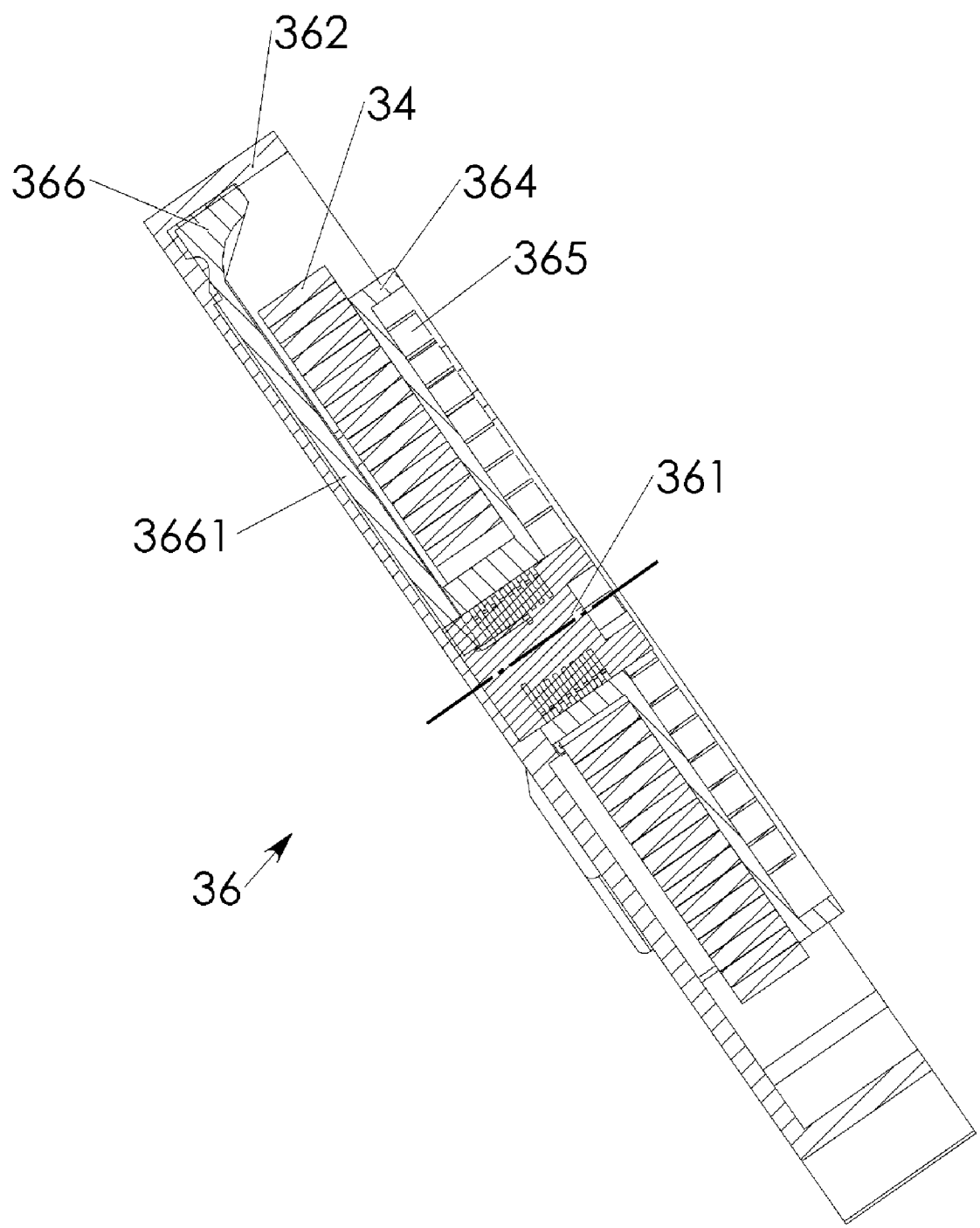
Fig. AA

DUAL LEVEL MODULAR NETWORK CABLE HUB

FIELD OF INVENTION

The present invention relates to systems for providing multiple cables to a number of rack mounted computers. In particular, the present invention relates to a rack mountable unit that modularly provides multiple retractable network connection cables.

BACKGROUND OF INVENTION

In a conventional server station, multiple computers and other server station components are commonly assembled in standardized racks. Several racks may be placed next to each other to accommodate for eventual large numbers of such server station devices. Individual server station devices need to be fast and easily connected and disconnected from the server station to reduce overall maintenance of the server station. Due to ever increasing number and complexity of server station components and the affiliated network wiring, the task of connecting, reconnecting and/or sorting out the network cables may become excessively time consuming. Therefore, there exists a need for a simple, modular network cable connection system that is easily scaled and adjusted. The present invention addresses this need.

Sorting and untangling of multiple network cables that are connecting rack mounted server station components with a hub may be particularly cumbersome in cases of loosely hanging network cables. Therefore there exists a need for a network cable connection system that provides straightened network cable connections and a spooling of excess cables. The present invention addresses also this need.

Server station components may vary with their network connectors. Therefore there exists a need for a network cable connection system that may be modularly adjusted in an ergonomic fashion to varying network connector standards. The present invention addresses also this need.

Server station architectures commonly incorporate generic 19" racks and server station components are also commonly dimensioned to that standard. For a most efficient use of rack space for server station components it is desirable to have a rack integrated network cable connection system that provides a maximum number of individually dispensable network cables within a minimum rack face area. The present invention addresses also this need.

In the prior art, spooling of hundred-plus MHz transmitting data cables is commonly accomplished by double cable spooling whereby a required employment of a continuous rotating contact hub is circumvented. Single cable spooling to the contrary is a prerequisite for integrating a cable spool in a larger assembly by providing a stationary spool connector that electrically connects to an extendable connector via a spooled cable and a continuously rotating contact hub. Therefore, there exists a need for a hundred-plus MHz transmitting continuously rotating contact hub. The present invention addresses this need.

SUMMARY

A rack unit includes preferably at least twenty four snap-in cassettes slide ably fitting through a main access opening of a chassis preferably fitting in a 19" computer rack. Each snap-in cassette houses preferably two spool cartridges behind each other amounting to preferably at least forty eight spooled network cables. The snap-in cassettes may be snap arrested inside the chassis via a latching feature such that preferably two rear connectors of the assembled cartridges are peripherally accessible at the rear side of the chassis.

The rear connectors are conductively connected via a contact drum axle and a spooled cable to an extendable front connector that is configured to connect to the server station component. The spooled cables are retractably spooled around the contact axle preferably in a spring loaded fashion such that the spooled cable remains straightened after connecting the front connector to the respective network connector. In case a network cable needs to be disconnected, the front connector only needs to be unplugged and the cable is spooled into its respective spool cartridge that again is contained inside the snap-in cassette.

Individual spool cartridges may be conveniently replaced inside a snap-in cassette while that respective snap-in cassette is released at the backside of the chassis and pulled out of its respective chassis slot. The same snap-in feature that locks the snap-in cassette in its assembly position may serve as a hinge hook at the front to the chassis such that the snap-in cassette may loosely hang down from the bottom edge of the chassi's frontal access opening. The loosely hanging snap-in cassette remains sufficiently stabilized with its top side accessible for inserting and/or removing individual spool cartridges. The spool cartridges of a number of adjacent snap-in cassettes may be simultaneously accessed via the top access. This top access in combination with the hinging access positioning of the snap-in cassettes, the spring loaded self spooling of the cables and the dual level modularity of the spool cartridges inside the snap-in cassettes inside the chassis provide for fastest and most easy configuration of the rack unit as may be well appreciated by anyone skilled in the art.

The single cable spooling inside the spool cartridges is accomplished by a specially configured sliding contact spool hub that keeps noise and cross talk at sufficiently low levels such that signal frequencies of significantly above 100 MHz may be reliably transmitted across the spool hub in conjunction with well known CAT5 and eventually CAT6 performance criteria.

BRIEF DESCRIPTION OF THE FIGURES

FIG. 2A is a second perspective view of rack unit of FIG. 1. Side housing portions of the one hinging snap-in cassette and of its inserted spool cartridges are removed for visibility of the spooled cables.

FIG. 2B is a detail view of a detail 2B indicated in FIG. 2A.

FIG. 2C is a detail view of a detail 2C indicated in FIG. 2A.

Figure 6:
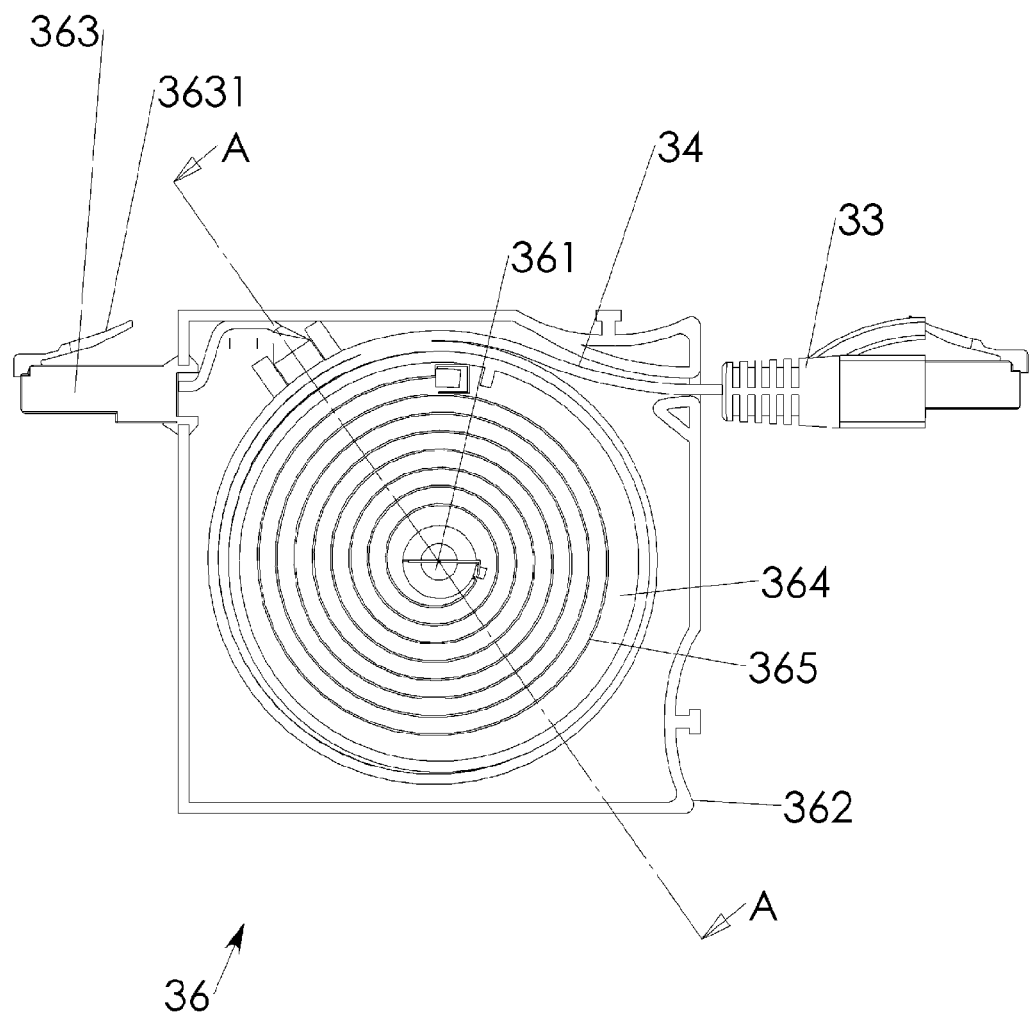
FIG. 6 is a side view of a spool cartridge with a side housing portion of that spool cartridge being removed.
Figure 7:
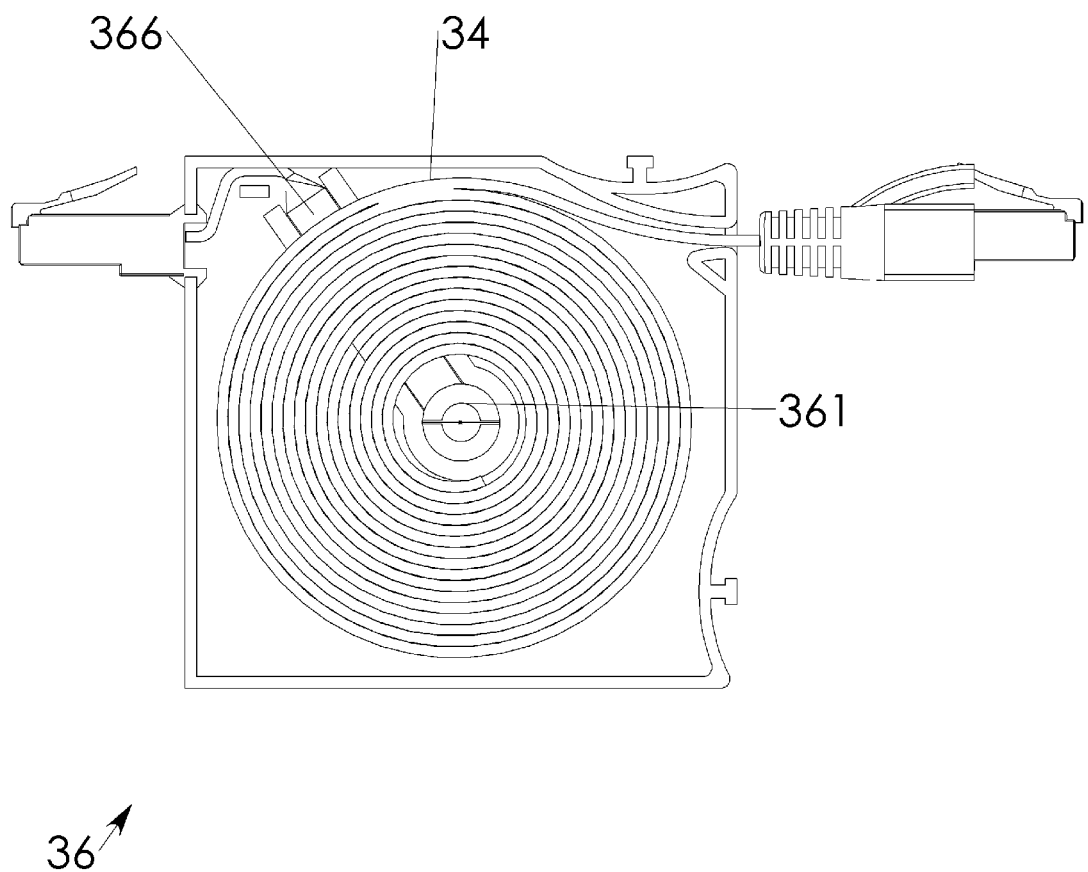
FIG. 7 is a side view of the spool cartridge of FIG. 6 with a coil spring and a spool drum of that spool cartridge being removed.

FIG. AA is a cross sectional view of the spool cartridge of FIG. 6 cut along a section line A-A indicated in FIG. 6.

Figure 8:
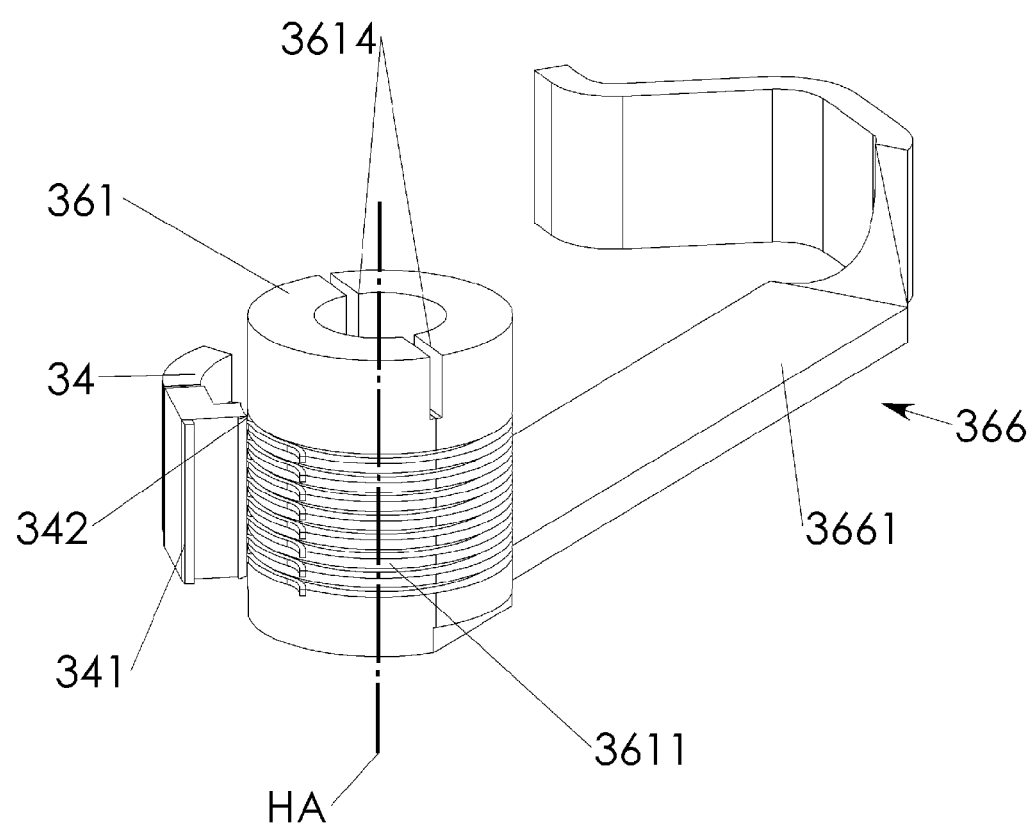

FIG. 8 is a fourth perspective view of a cable spool hub and slider detail.

Figure 9:
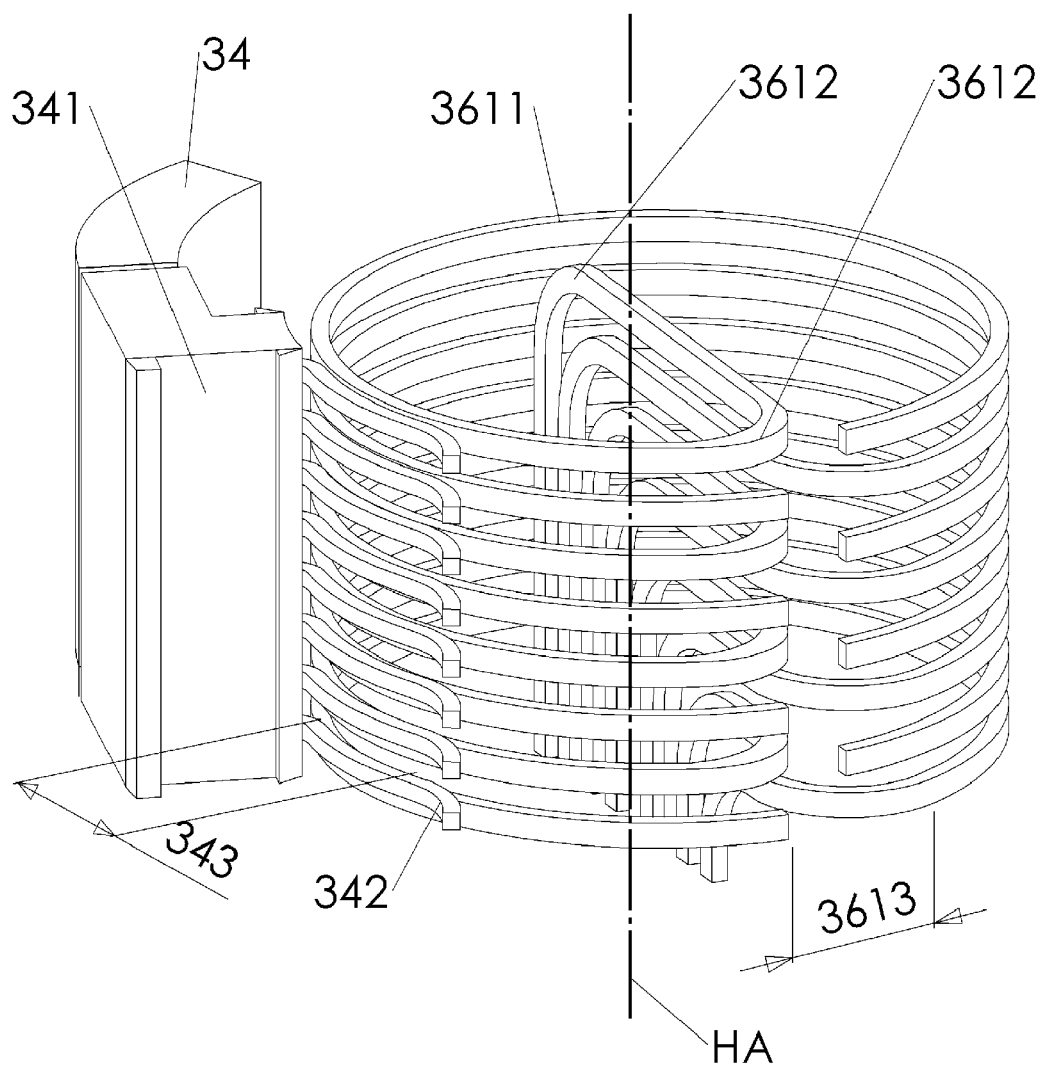

FIG. 9 is the fourth perspective in scale view of slider and hub contacts of FIG. 9.

DETAILED DESCRIPTION

Figure 1:
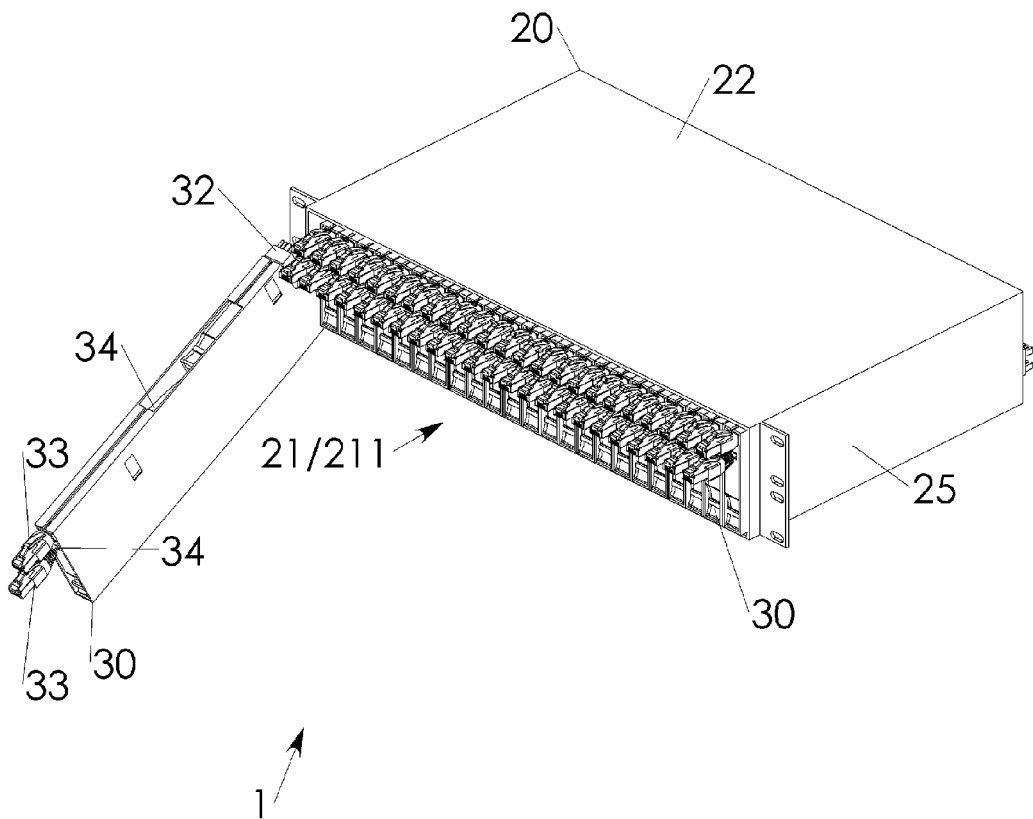
FIG. 1 is a first perspective view of the rack unit with all but one snap-in cassettes assembled and one snap-in cassette hinging at the bottom edge of the frontal access opening.
Figure 3:
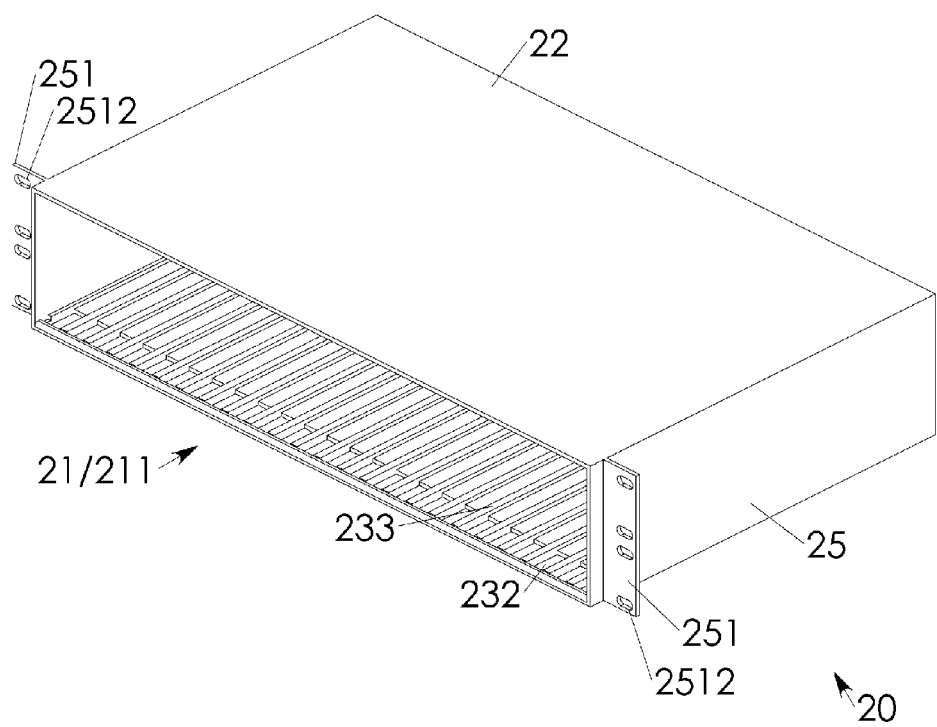
FIG. 3 is the first perspective view of the chassis of FIG. 1.

Referring to FIGS. 1-3, a multiple retractable cable dispensing rack unit 1 in accordance with a preferred embodiment of the invention includes a chassis 20, at least one but preferably at least twenty four snap-in cassettes 30. The chassis 20 has two side walls 25, a top cover 22, a bottom cover 23, a rear side 24 with a rear access perforation 241 and a front side 21 with a main access opening 211 preferably occupying substantially the entire front side 21. In at least one of the top and the bottom cover 22, 23 but preferably in the bottom cover 23 are a snap-in perforation 231 and a trap perforation 232. The snap-in perforation 231 is preferably adjacent the rear side 24 and the trap perforation 232 is preferably adjacent the front side 21.

The snap-in cassettes 30 slideably fit substantially through the main access opening 211 and in between the front side 21 and the rear side 24 and in between the top cover 22 and the bottom cover 23. In addition, the chassis 20 may feature cassette rails 233 for a lateral positioning and guiding of the snap-in cassettes 30. In that way, the snap-in cassettes 30 may be laterally and independently slideably inserted via the main access opening 211 and interchangeable fixed in the chassis 20. Preferably each snap-in cassette 30 features rear connectors 32 in a number equal the number of spool cartridges 36 contained inside the respective snap-in cassette 30. The rear connectors 32 are extending through and peripherally accessible at the rear access perforation 24 while the respective snap-in cassette 30 is snap-in arrested as said. The rear connectors 32 may be directly conductively connected to an adjacent oppositely positioned internal spool connector 35. In case the internal cassette connector 35 is in a distance, an intermediate extension cable 351 with extension connector 352 may connect to an internal mating connector 354 of the rear connector 32. Internal mating connector and internal spool connector 35 may be identically configured for ease of fabrication.

Figure 4:
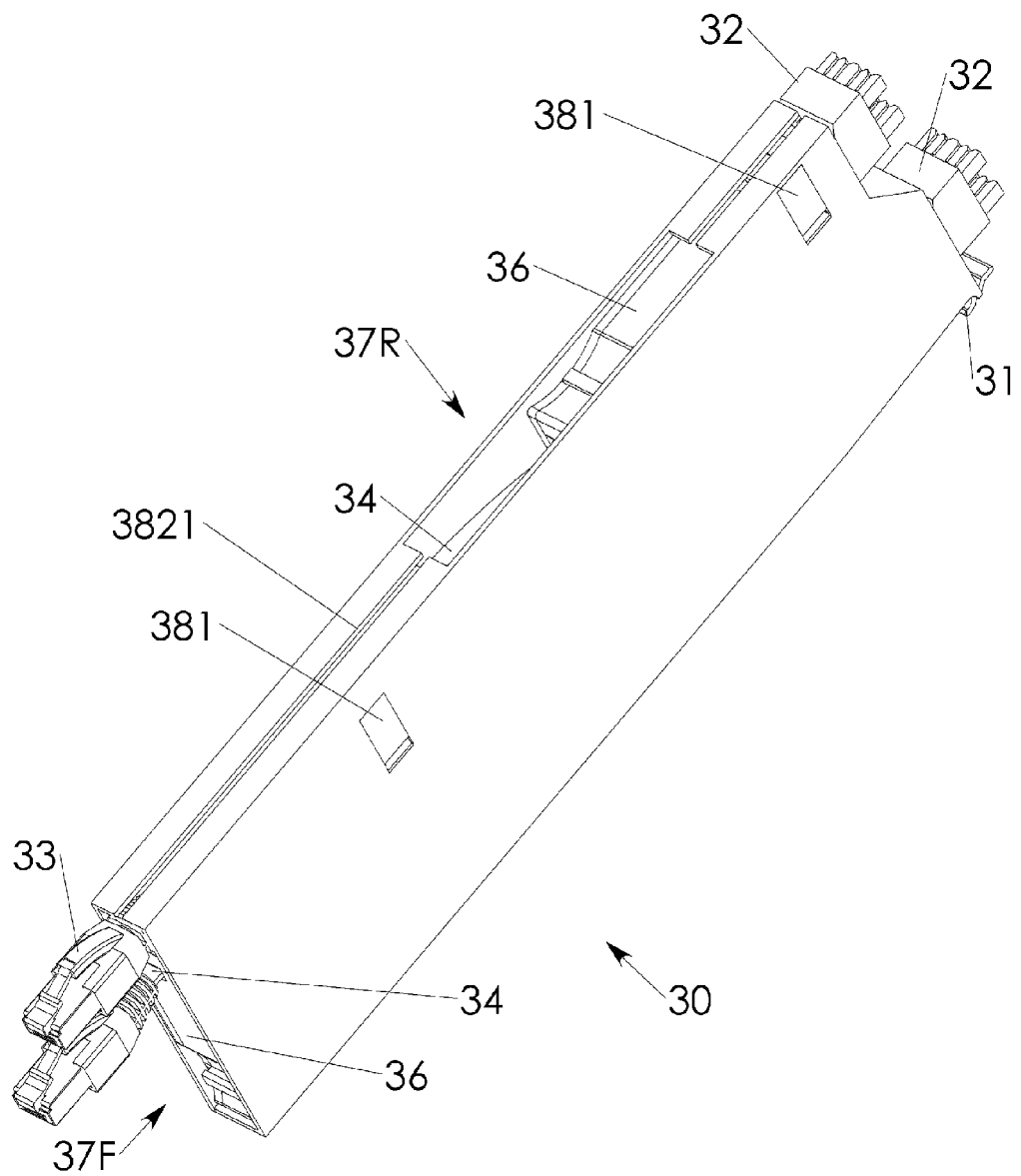
FIG. 4 is the first perspective view of the hinging snap-in cassette of FIG. 1.
Figure 5:
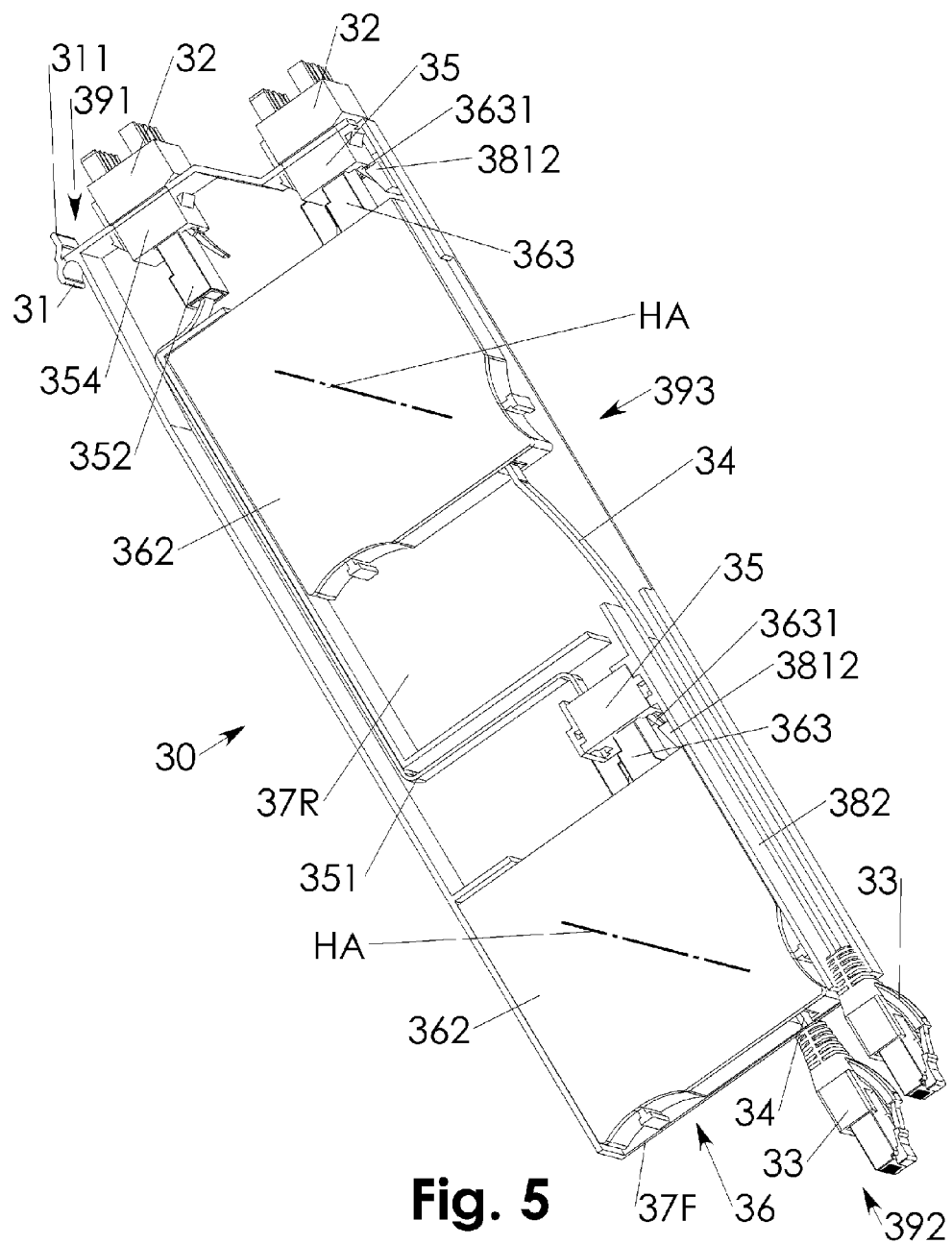
FIG. 5 is a third perspective view of a snap-in cassette with a side housing portion of that snap-in cassette being removed.

Further referring to FIG. 4-AA, preferably each snap-in cassette 30 features also an extendable front connector 33 that is conductively through connected with a respective rear connector 32 at least via a spooled cable 34 and a contact hub 361 but preferably also via external cassette connector 363, internal spool connector 35 and eventually via extension cable 351, extension connector 352 and internal mating connector 354. The spooled cable 34 is preferably autonomously retracting and spooled around the contact hub 361. The autonomous retraction of the spooled cable 34 may be provided by a retracting spring 365 configured as a well known coil spring 365. The coil spring 365 may exert a spring loaded torque onto a cable drum 364 while withholding itself in a torque transfer slot 3614 of the contact hub 361 that is rigidly connected with a spool housing 362. The spooled cable 34 is spooled on the cable drum 364.

The snap-in cassette 30 has also a latching feature 31 configured in conjunction with at least the snap-in perforation 231 but preferably also in conjunction with the trap perforation 232. In that way, the latching feature 31 may be peripherally accessed and manually actuated via a manual actuator 311 while the latching feature 31 is engaged in the snap-in perforation 231 and while the respective snap-in cassette 30 is snap arrested as said.

The latching feature 31 may also be configured in conjunction with the trap perforation 232 that is positioned adjacent the main access opening 211 and at the same one of the top cover 22 and the bottom cover 23 as the snap-in perforation 231 such that the respective snap-in cassette 30 is pivotably arrested immediately prior to being fully slideably removed from the chassis 20 as shown in FIGS. 1, 2A. The latching feature 31 has a manual actuator 311 that is peripherally accessible at the rear side 24 while the snap-in cassette 30 is snapped in and fixed.

The chassis 20 may feature rack flanges 251 with rack screw holes 2512 via which the multiple retractable cable dispensing rack unit 1 may be fixed in a standard 19" computer rack as is well known in the art. To fit into such 19" computer rack, the chassis 20 may have a rack width 20W of up to about 16.8 inches and a rack depth 20D of up to about 10 inches. To occupy minimal rack height, the chassis 20 may have a rack height 20H of not more than 3.5 inches. Within that spatial envelope of the chassis 20 are up to twenty four snap-in cassettes 30 snap arrested and interchangeable fixed. Preferably each snap-in cassette 30 may have at least two spool cartridges 36 such that at least two extendable front connectors 33 may be pulled out and extend at least 70 inches at the cassette front 392 via their respective spooled cable 34.

The extendable front connectors 33 are eight fold independently conductively connected with a respective rear connector 32 in accordance with at least a well known CAT5e but preferably a CAT6 performance criteria as specified by ANSI/TIA/EIA-568-B.2-2001. The extendable front connector 33 may be a well known CAT5, or CAT5e, or CAT6 or USB connector. Well known data signals may be transmitted between respective rear connectors 32 and extendable front connectors 33 and across the contact hub 361 with at least 100 MHz.

Spooling of the spooled cable 34 may be optimized by providing the spooled cable 34 with a substantially flat cross section such that the spooled cable 34 may easily bend and roll up while being spooled. The substantially flat cross section may have a width to height ratio of preferably at least five.

Dual level modularity of the multiple retractable cable dispensing unit 1 is provided by at least one but preferably two spool cartridges 36 that are interchangeable fixed inside a respective one of the snap-in cassettes 30, which in turn are interchangeable fixed inside the chassis 20. Interchangeable fixed in the context of the present invention means that the snap-in cassettes 30 and/or the spool cartridges 36 are fixed, removed or replaced in a routinely fashion preferably without use of any tools.

Each spool cartridge 36 features a spool housing 362 that encapsulates the contact hub 361 and a cable drum 364 that is rotatable guided by the contact hub 361 for spooling the spooled cable 34. Also part of each spool cartridge 36 is an external cassette connector 363 in a mating configuration with an internal spool connector 35, which is positioned inside each snap-in cassette 30 and conductively connected with a respective rear connector 32. The external cassette connectors 363 are conductively connected to respective extendable front connectors 33 via a respective hub connect cable 366, contact hub 361 and spooled cable 34. In that way, the conductive through connection is established between rear connector 32 and extendable front connector 33 while a respective one spool cartridge 36 is interchangeable fixed inside a respective one snap-in cassette 30 and while a respective one external cassette connector 363 is coupled with a respective one internal spool connector 35.

The cassette housing 38 of the snap-in cassette 30 has holding slots 37F, 37R, which have a mating configuration with the spool housing 362 for interchangeable fixing the spool cartridge 36 within the cassette housing 38. The holding slots 37F, 37R are further configured in conjunction with the spool housing 362, the external cassette connector 363 and the internal spool connector 35 such that the external cassette connector 363 connects to the internal spool connector 35 while the spool cartridge 36 is inserted and guided moved into its fixed position at least within the outside boundaries of the snap-in cassette 30 but preferably within the cassette housing 38. A frontal holding slot 37F may be directly accessible at the cassette front 392. A rear holding slot 37R may be accessible at the cassette top 393.

The external cassette connector 363 and the internal spool connector 35 preferably snap mate. In this case, the snap mating may be remotely decoupled via a snap release actuator 381. The external cassette connector 363 and the internal spool connector 35 as well as the extension connector 352 and the internal matting connector 354 may be mating CAT5 or CAT5e or CAT6 connectors that are well established in the industry at the time of this invention for high data through put.

Common to CAT5, CAT5e and CAT6 connectors is an integrated snapping mechanism including a release lever 3631 for peripherally disconnecting the snapped connection between the two mating connectors as is well known in the art. The snap release actuator 381 may have a contact lip 3812 that is positioned in conjunction with such connector release lever 3631 such that peripheral actuation of the release actuator 381 is transferred via the contact lip 3812 onto the connector release lever 3631 decoupling the mating connection between external cassette connector 363 and internal spool connector 35.

To take advantage of the extended depth of computer racks while occupying a minimum of rack height, the rack depth 20D is preferably a multiple of the rack height 20H. Spooling a cable to the contrary requires a substantially circular spacing around the hub axis HA and consequently a substantially equally deep and high spool housing 362. Therefore, preferably two or more spool cartridges 36 may be interchangeable fixed inside a single snap-in cassette 30 behind each other with respect to a cassette front side 392. In that case, each of the snap-in cassettes 30 may feature two or more internal spool connector 35, two or more spool cartridges 36 interchangeable fixed in one frontal holding slot 37F and one or more rear holding slots 37R. Extending between each rear holding slot 37R and the cassette front 392 may be an externally accessible cable channel 382. The externally accessible cable channel 382 may have a cable channel opening 3812 through the cassette housing 38 at the cassette top 393. Through the cable channel opening 3812 a spooled cable 34 may be inserted in or removed from the externally accessible cable channel 382 while a spool cartridge 36 is inserted or removed from a rear holding slot 37R. As a result, two or more of the extendable front connectors 33 are interchangeable accessible at the main access opening 211 and at least respective two rear connectors 32 are accessible at the rear side 24 while the snap-in cassette 30 is interchangeable fixed inside the chassis 20. For easy access to individual spool cartridges without having to fully remove the snap-in cassette 30 from the chassis 20, the rear holding slot(s) 37R behind the frontal holding slot 37F and the externally accessible cable channel 382 are preferably accessible at a cassette top 393. The frontal holding slot 37 may be accessible at the cassette front 392.

Referring to FIGS. 8 and 9, the preferably continuous rotating contact hub 361 comprises collector wires 3611 that are connected to the external cassette connector 363 via a hub connect cable 366. A radial portion 3661 of the hub connect cable is kept flat adjacent or embedded in the spool housing 362 in the vicinity of the cable drum 364. In that way, the radial connect cable portion 3661 contributes to a minimal overall width of the spool cartridge 36 and consequently of the snap-in cartridge 30, which in turn contributes to a maximum number of snap-in cartridges 30 assembled along the rack width 20W.

The collector wires 3611 may be wrapped in alternately opposite direction around the rotation axis HA of the contact hub 361, which results in cancellation of high frequency electromagnetic fields eventually occurring in adjacent wrapped collector wires 3611 during electrical signal transmission. Also, the collector wire bends 3612 are free of sharp corners, which results in reduced high frequency electromagnetic corner field emission also eventually occurring during electrical signal transmission. Both alternately opposing wire wrapping and non sharp wire bends 3612 contribute to a high signal transmission capacity of substantially above 100 MHz, which is called hundred-plus MHz in context of the present invention.

Due to the non sharp bends 3612 there exists a collector wire gap 3613. A slider head 341 combined with the cable drum 364 may hold sliders 342 in a number equal the number of collector wires 3611 and in contacting position with respect to the collector wires 3611 while the cable drum 364 rotates around the hub axis HA. The sliders 342 may have a contact extension 343 substantially larger than the collector wire gap 3613 such that snug area contact between respective sliders 342 and collector wires 3611 is warranted at any rotational position of the slider head 341.

After the multiple retractable cable dispensing rack unit 1 is mounted in a computer rack, the extendable front connectors 33 may be pulled out at the respective cassette fronts 392 and connected to computing devices. The retract springs 365 keep the pulled out spooled cable 34 under tension and assure a straight cable connection to the computer. The rear connectors 32 may be connected to a well known central network distribution cable string. A large number of computers may be thereby conveniently connected to a network with clear oversight of which spooled cable 34 connects to which computer. In case a computer needs to be disconnected, the respective extendable front connector 33 just needs to be pulled out and the respective retract spring 364 spools the spooled cable 34 back in.

In case a computer needs to be connected with a connector standard not present in the multiple retractable cable dispensing unit 1, a snap-in cassette 30 may be released from its interchangeable fixed position by manually actuating the manual actuator 311 after disconnecting the respective rear connector(s) 32. The released snap-in cassette 30 may be moved forward until the latching feature 31 engages with the trap perforation 232. There, the respective snap-in cassette 30 may be loosely held hanging down the chassis 20. A spool cartridge 36 may be replaced from the rear holding slot 37 by actuating the snap release actuator 381. Then a spool cartridge 36 having an extendable front connector 33 in desired configuration may be reinserted. In case an extendable front connector 33 needs to be replaced with a spool cartridge 36 from a front holding slot 37F, the respective snap-in cartridge 30 may be pulled out only as far as to laterally access the respective snap release actuator 381.

Accordingly, the scope of the invention described in the Figures and the Specification above is set forth by the following Claims and their legal equivalent:

What is claimed is:

1. A multiple retractable cable dispensing rack unit comprising:
   a. a chassis comprising a front side with a main access opening, a top cover, a bottom cover, a rear side, two side walls, at least one rear access perforation in said rear side;

b. at least one snap-in cassette slideably fitting substantially through said main access opening and in between said front side and said rear side and in between said top cover and said bottom cover for slideably inserting said snap-in cassette in said chassis via said main access opening in a fashion such that a number of said snap-in cassette may be laterally and independently slideably inserted and interchangeable fixed in said chassis; wherein:
  ii. said snap-in cassette comprises a cartridge rear connector that extends through and is peripherally accessible at said rear access perforation while said snap-in cassette is fixed; and
  iii. said snap-in cassette comprises an extendable front connector that is conductively through connected with said cartridge rear connector at least via a spooled cable and a contact hub.

2. The multiple retractable cable dispensing rack unit of claim 1, wherein said spooled cable is autonomously retracting spooled around said contact hub.

3. The multiple retractable cable dispensing rack unit of claim 2, wherein said autonomously retracting is provided by a retracting spring adjacent said spooled cable and acting on a cable drum on which said spooled cable is spooled.

4. The multiple retractable cable dispensing rack unit of claim 1, wherein:
  a. said chassis comprises at least one snap-in perforation in at least one of said top cover and said bottom cover;
  b. said snap-in cassette comprises a latching feature being configured in conjunction with said snap-in perforation such that said latching feature is peripherally accessed and manually actuated while said latching feature is engaged in said snap-in perforation and while said snap-in cassette is snap arrested.

5. The multiple retractable cable dispensing rack unit of claim 4, wherein:
  a. said snap-in perforation is positioned adjacent said rear side;
  b. said latching feature is positioned at a rear edge of said snap-in cassette and comprises a manual actuator that is peripherally accessible at said rear side while said snap-in cassette is fixed;
  c. said at least one of said top cover and said bottom cover with said snap-in perforation comprises a trap perforation adjacent said main access opening; and
  d. said trap perforation being configured in conjunction with said latching feature such that said snap-in cassette is pivot ably arrested immediately prior to said snap-in cassette being fully slide ably removed from said chassis.

6. The multiple retractable cable dispensing rack unit of claim 1, wherein said chassis has a rack width of up to about 16.8 inches, a rack height of up to 3.5 inches and a rack depth of up to about 10 inches, wherein up to twenty four of said snap-in cassette are said snap arrested, wherein at least one of said up to twenty four snap-in cassettes comprises two of said extendable front connector, wherein each of said two front connectors is extendable at least 70 inches via said spooled cable, and wherein at least one of said extendable front connectors and said cartridge rear connector are eight fold independently conductively connected in accordance with at least a CAT5e performance criteria.

7. The multiple retractable cable dispensing rack unit of claim 6, wherein said extendable front connector is a CAT5 connector.

8. The multiple retractable cable dispensing rack unit of claim 6, wherein said extendable front connector is a CAT5e connector.

9. The multiple retractable cable dispensing rack unit of claim 6, wherein said extendable front connector is a CAT6 connector.

10. The multiple retractable cable dispensing rack unit of claim 6, wherein said extendable front connector is a USB connector.

11. The multiple retractable cable dispensing rack unit of claim 6, comprising a data signal transmission capability of at least 100 MHz between said cartridge rear connector and said extendable front connector and across said contact hub.

12. The multiple retractable cable dispensing rack unit of claim 1, wherein said spooled cable has a substantially flat cross section with a width to height ratio of at least five.

13. The multiple retractable cable dispensing rack unit of claim 1 wherein said snap-in cassette further comprises:
  a. an internal spool connector conductively connected with said cartridge rear connector;
  b. a spool cartridge held inside said snap-in cassette such that said multiple retractable cable dispensing rack unit comprises a dual level modularity with said spool cartridge being interchangeable fixed within said snap-in cassette being interchangeable fixed within said chassis, said spool cartridge comprising:
    i. said contact hub and a cable drum rotating around said contact hub for said spooling of said spooled cable:
    ii. a spool housing encapsulating at least said cable drum and said contact hub;
    iii. an external cassette connector in a mating configuration with said internal spool connector and conductively connected to said extendable front connector via a hub connect cable, said contact hub and said spooled cable such that said conductive through connection is established while said spool cartridge is interchangeable fixed inside said snap-in cassette and while said external cassette connector is coupled with said internal spool connector; and
  c. a cassette housing comprising a holding slot in a mating configuration with said spool housing for said interchangeable fixing of said spool cartridge within said cassette housing, said holding slot being configured in conjunction with said spool housing, said external cassette connector and said internal spool connector such that said external cassette connector connects to said internal spool connector while said spool cartridge is inserted and guided moved into fixed position at least within an outside boundary of said snap-in cassette.

14. The multiple retractable cable dispensing rack unit of claim 13, wherein said external cassette connector and said internal spool connector snap mate, and wherein said snap mating is remotely decoupled by peripheral actuation of a snap release actuator.

15. The multiple retractable cable dispensing rack unit of claim 14, wherein said external cassette connector and said internal spool connector are mating connectors selected from a connector standard having a connector release lever.

16. The multiple retractable cable dispensing rack unit of claim 15, wherein said connector standard is CAT5.

17. The multiple retractable cable dispensing rack unit of claim 15, wherein said connector standard is CAT5e.

18. The multiple retractable cable dispensing rack unit of claim 15, wherein said connector standard is CAT6.

19. The multiple retractable cable dispensing rack unit of claim 15, wherein said snap release actuator comprises a contact lip positioned in conjunction with said connector release lever such that said peripheral actuation is transferred via said contact lip onto said connector release lever.

20. The multiple retractable cable dispensing rack unit of claim 13, wherein said snap-in cassette comprises at least two of said internal spool connector, at least two of said spool cartridge, at least two of said holding slot and an externally accessible cable channel such that at least two of said extendable front connector are accessible at said front side and at least two respective of said rear connector are accessible at said rear side while said snap-in cassette is snap interchangeable fixed and while one of said two cable cartridges is held behind one other of said two cable cartridges with respect to said cassette front.

21. The multiple retractable cable dispensing rack unit of claim 20, wherein said holding slot is a rear holding slot accessible at a cassette top of said snap-in cassette.

22. The multiple retractable cable dispensing rack unit of claim 20, wherein said externally accessible cable channel is accessible at a cassette top of said snap-in cassette.

23. The multiple retractable cable dispensing rack unit of claim 20, wherein said holding slot is a frontal holding slot accessible at said cassette front.

24. The multiple retractable cable dispensing rack unit of claim 1, wherein said contact hub comprises a collector wire bent free of sharp corners.

25. The multiple retractable cable dispensing rack unit of claim 24, wherein said collector wire is wrapped around a hub axis with a collector wire gap, and wherein a slider has a contact extension substantially larger than said collector wire gap.

26. The multiple retractable cable dispensing rack unit of claim 1, comprising at least two collector wires wrapped in alternately opposite direction around a rotation axis of said contact hub.

27. The multiple retractable cable dispensing rack unit of claim 1, wherein said contact hub is continuously rotating.

28. A hundred-plus MHz transmitting and continuously rotating contact hub comprising at least two collector wires wrapped in alternately opposing direction around a rotation axis of said hundred-plus MHz transmitting and continuously rotating contact hub.

29. The hundred-plus MHz transmitting and continuously rotating contact hub of claim 28, wherein said at least two collector wires comprise bends free of sharp corners.

30. The multiple retractable cable dispensing rack unit of claim 29, wherein said collector wire is wrapped around said hub axis with a collector wire gap, and wherein a slider has a contact extension substantially larger than said collector wire gap.

* * * * *